United States Patent [19]

LaFreniere

[11] Patent Number: 4,832,354
[45] Date of Patent: May 23, 1989

[54] COMBINATION STROLLER AND CAR SEAT

[76] Inventor: Terry R. LaFreniere, 506 Griggs Ave., Grafton, N. Dak. 58237

[21] Appl. No.: 211,572

[22] Filed: Jun. 27, 1988

[51] Int. Cl.⁴ .............................................. B62B 1/04
[52] U.S. Cl. ..................................... 280/30; 280/643; 280/648; 280/47.371; 297/130; 297/377
[58] Field of Search ................. 297/130, 377, DIG. 4; 280/30, 37, 642, 643, 648, 650, 657, 658, 47.37 R, 47.38

[56] References Cited

U.S. PATENT DOCUMENTS

| | | | |
|---|---|---|---|
| 2,435,733 | 2/1948 | Belyeu | 280/30 |
| 2,481,382 | 9/1949 | Bennett | 280/30 |
| 2,803,468 | 8/1957 | Thompson | 280/30 |
| 3,070,385 | 12/1962 | Claessens | 280/37 |
| 3,463,504 | 8/1969 | Petry et al. | 280/31 |
| 4,620,711 | 11/1986 | Dick | 280/30 |
| 4,632,409 | 12/1986 | Hall et al. | 280/30 |
| 4,641,844 | 2/1987 | Mar et al. | 280/30 |
| 4,647,054 | 3/1987 | Chong | 280/30 |
| 4,679,804 | 7/1987 | Johnson | 280/30 |
| 4,685,688 | 8/1987 | Edwards | 280/30 |
| 4,763,911 | 8/1988 | Gebhard et al. | 280/37 |

FOREIGN PATENT DOCUMENTS

| | | | |
|---|---|---|---|
| 141076 | 5/1951 | Australia | 280/37 |
| 1112005 | 3/1956 | France | 280/30 |
| 238409 | 8/1925 | United Kingdom | 280/37 |

Primary Examiner—Charles A. Marmor
Assistant Examiner—Michael Mar
Attorney, Agent, or Firm—Orrin M. Haugen; Thomas J. Nikolai; Frederick W. Niebuhr

[57] ABSTRACT

A convertible carrier for infants and small children is adjustable to alternative stroller and car seat configurations. The rear wheels of the carrier are mounted on levers which pivot relative to a frame supporting a contoured shell of the carrier. A telescoping handle, mounted pivotally to the levers at points spaced apart from the rear wheels, can be pushed or pulled to pivot the levers, to position the rear wheels in respective operative and storage (car seat) positions. The forward wheels of the carrier can be rotatably mounted directly to the frame. Alternatively, the front wheels can be mounted to the frame through forward levers which pivot on the frame, and are associated with the rearward levers through linking rods, whereby pivoting of the rearward levers causes a corresponding pivoting of the forward levers between operative and storage positions.

11 Claims, 3 Drawing Sheets

COMBINATION STROLLER AND CAR SEAT

BACKGROUND OF THE INVENTION

This invention relates to apparatus for carrying infants and small children, and more particularly to a carrier adjustable for alternative use as a stroller and as a protective seat for a child in an automobile.

Carriers for infants and small children are universally recognized as a means for enhancing the safety and comfort of small children, while increasing the convenience of adults caring for the children. One such device particularly well suited for pedestrian trips, known as a stroller, includes a shell or fabric structure with a generally horizontal leg rest to support the legs and seat of the child, and a back rest generally upright or slightly backwardly inclined. A frame and wheels support the shell for convenient movement over a sidewalk or other horizontal surface. Another type of carrier is the car seat, which can be strapped to the seat of an automobile using seatbelts available for adult passengers, typically to support the child in a forward facing disposition similar to that of the stroller. However, a more recent automobile seat particularly designed for infants, positions the infant to face rearwardly of the automobile, and is believed safer for small children, e.g. from infancy to perhaps a year old or so.

The ordinary activities of adults caring for small children not only include automobile and pedestrian travel, but frequent transitions between these activities. Accordingly, it is desirable to provide child carriers that are interchangeable for alternative use as strollers and as car seats. For example, U.S. Pat. No. 4,620,711 (Dick) discloses three versions of the child seat, each of which functions either as a car seat or a stroller. In one version shown in FIGS. 7–9, a handle can be unlatched to fold or pivot downwardly, thus to cause a link to pivot rear wheel supporting brackets, in turn moving another link which simultaneously pivots the front wheels. Thus, moving the handle forwardly pivots the wheels from a tuck-under car seat disposition to an operative disposition for use of the device as a stroller.

U.S. Pat. No. 4,685,688 (Edwards) discloses a seat utilizing telescoping handle and telescoping wheel supporting legs in connection with the front and rear wheels. Telescoping handles or push bars, in combination with pivotally mounted foward and rearward wheels, are disclosed in U.S. Pat. No. 4,679,804 (Johnson) and U.S. Pat. No. 4,647,054 (Chong). In these cases, however, the wheels pivot separately and are not actuated by movement of the handle. All of these devices, while perhaps suitable for certain applications, tend to be somewhat bulky and complex, requiring too many separate adjustments or involving too many moving linkages and pivots. Moreover, when used as car seats, all of these devices position the child to face forwardly with respect to the automobile.

Therefore, it is an object of the present invention to provide a relatively lightweight, simple and convenient apparatus adjustable for alternative use as a stroller and as an automobile seat for infants and small children.

Another object of the invention is to provide a child carrier adjustable between alternative positions using a minimum of moving parts to enhance its reliability, convenience and safety.

Another object of the invention is to provide a support apparatus for retrofitting a known, commercially available infant car seat, to facilitate the use of such car seat alternatively as a stroller.

Yet another object of the invention is to provide a combination stroller and automobile seat for infants and small children, which, when used as a car seat, positions the child to face rearwardly of the automobile.

SUMMARY OF THE INVENTION

To achieve these and other objects, there is provided an apparatus for carrying infants and small children in alternative stroller and automobile seat modes. The apparatus includes a shell contoured for carrying an infant or small child, with a back rest and a leg rest disposed forwardly of the back rest. A frame supports the shell in spaced apart relation to a generally horizontal surface. The frame is integral with and extends downwardly of the shell, and has a forward frame end beneath the leg rest and a rearward frame end beneath the back rest. A first wheel supporting lever means is mounted proximate one of the forward and rearward frame ends to pivot about a horizontal first axis between first and second lever positions relative to the frame. The first lever means includes a stop means positioned to engage the frame responsive to pivoting the first lever means to the first lever position, and further positioned such that the weight of the shell and frame means tends to maintain the stop means and frame means engaged. First and second wheels are mounted rotatably with respect to the opposite frame end. Third and fourth wheels are mounted rotatably to the first lever means for rotation about a second axis parallel to the first axis. The third and fourth wheels are disposed in an operative location when the first lever means is in the first lever position. These wheels are disposed in a storage location beneath the frame when the first lever means is in the second lever position.

Further, the apparatus includes a handle having a generally horizontal center bar the first and second parallel arms extended from opposite sides of the center bar. The ends of the arms remote from the center bar are mounted pivotally to the first lever means to pivot about a third axis parallel to and spaced apart from the first axis, whereby the handle is pivotable between a handle operating position wherein the arms extend generally upwardly along and on opposite sides of the back rest to locate the center bar behind and above the back rest, and a handle storage location wherein the arms are disposed on opposite sides of and generally below the shell. The handle further is movable relative to the frame to selectively pivot the first lever means between the first and second lever positions.

Preferably the first and second arms have telescoping arm portions, whereby a user can extend the handle to a select height above the back rest during use of the stroller, and later retract the handle to its storage position for use of the carrier as a car seat. The first lever means is most advantageously mounted near the rearward frame end.

For retracting both the forward and rearward wheels, a second lever means can be provided near the forward frame end for pivoting about a fourth axis parallel to and spaced apart from the first axis. The first and second wheels are then mounted rotatably on the second lever means. The second lever means can pivot between a first lever location to place the front wheels in an operative disposition, and a second lever location to place the front wheels in a storage disposition beneath the frame. An arrangement of linking rods between the first and second lever means causes the second lever means to pivot to its first and second lever locations, respectively, responsive to the pivoting of the first lever means to its first and second positions. Thus, all of the wheels can be moved between their support and storage dispositions simply by moving the handle.

The direct pivot connection of the handle to the first lever means, along with use of the shell and frame weight to maintain the wheels in their operative dispositions, substantially simplifies the design of the apparatus to enhance its reliability. Further, locks or latches to secure the wheels are eliminated, to minimize the chance of injury to the child from contacting a linkage, moving pivot point, latch or the like. The telescoping handle mounted to the rear wheel supporting lever means ensures that the wheels can be conveniently manipulated as desired, simply by moving the handle. Also, the arrangement facilitates positioning the carrier to face rearwardly of the automobile when used as a car seat, thus to place the child in a position recognized as enhancing his or her safety.

IN THE DRAWINGS

For a further understanding of the above and other feature and advantages, reference is made to the following detailed description and the drawings, in which.

DETAILED DESCRIPTION OF THE PREFERRED EMBODIMENTS

Figure 1:
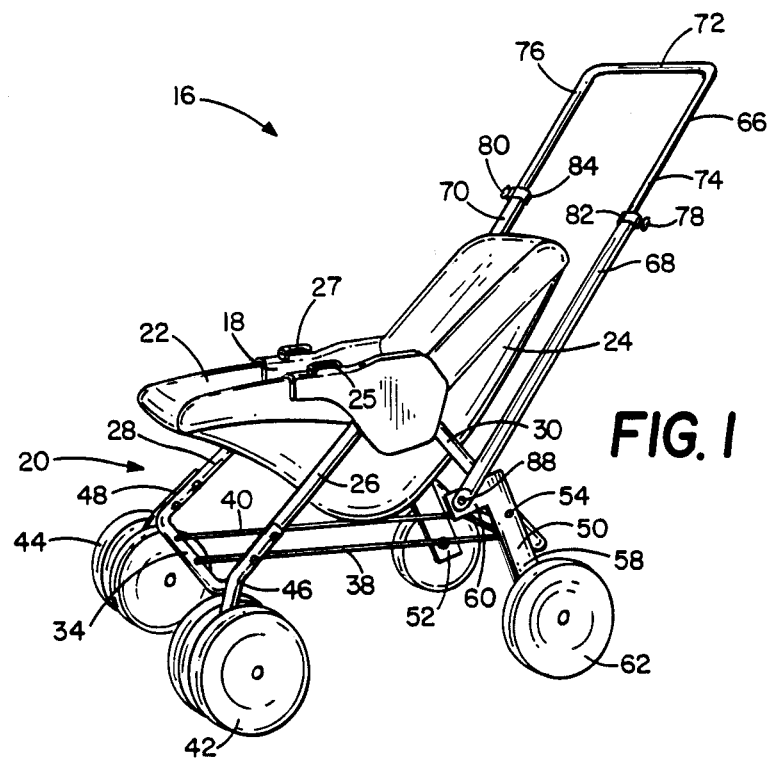
FIG. 1 is a perspective view of a child carrier constructed in accordance with the present invention and in a stroller configuration.

Turning now to the drawings, there is shown in FIG. 1 a carrier 16 particularly suitable for infants and small children. Carriers 16 includes a shell 18 supported above ground by a triangular frame assembly 20 integral with the shell. The shell is contoured for supporting infants and small children, and includes a forward portion or leg rest 22 generally horizontal but inclined upwardly and forwardly of the center of the shell, and a rearward portion or back rest 24 which supports the back of the child in a relatively upright disposition, actually somewhat upwardly and rearwardly inclined from the shell center. Shell 18 is constructed pursuant to a relatively recent but well known design particularly well suited for infants and very small children. In particular, it is provided with integral hooks 25 and 27 to facilitate its fastening to an automobile seat using an automobile seatbelt typically provided, and in a position in which the infant or child faces rearwardly of the automobile. Shell 18 is typically provided with its own belt and slot arrangement, now shown, for securing the infant within the shell. Such belt is independent of the automobile seatbelt, but cooperates with the automobile seatbelt in securing the infant relative to the automobile. Such shells are commercially available.

Frame assembly 20 includes two forward legs 26 and 28 inclined downwardly and forwardly of the shell, and two downwardly and rearwardly inclined rearward legs 30 and 32. A forward horizontal frame member 34 and a rearward horizontal frame member 36 join their respective legs. Two horizontal frame links 38 and 40 join the forward and rearward frame members, to complete the frame assembly.

Opposed pairs of front wheels, indicated at 42 and 44, are mounted rotatably to respective wheel supporting standards 46 and 48. The standards, in turn, are fixed to the frame assembly at forward leg 26 and forward leg 28, respectively. The front wheels preferably are mounted in caster fashion.

Opposed rear levers 50 and 52 are mounted pivotally with respect to rearward legs 30 and 32, respectively, through respective lever pivots 54 and 56 located on a common horizontal pivot axis. Levers 50 and 52 are L-shaped, each with a relatively long extension 58 and a perpendicular short extension 60. For better strength and appearance, however, the levers may be made triangular as shown in broken lines at 50a in FIG. 3. Opposed rear wheels 62 and 64 are mounted rotatably to the long extensions of levers 50 and 52, respectively. The rear wheels thus rotate on a common horizontal axis spaced apart from and parallel to the axis of lever pivots 54 and 56.

A handle 66 is mounted to carrier 16 to facilitate the pushing of the carrier when in its stroller configuration. The handle includes opposed hollow lower arms 68 and 70 mounted pivotally to the short extensions of levers 50 and 52. Preferably, arms 68 and 70 are mounted to their respective levers in a tight friction fit which tends to maintain the arms in a given angular relation to the levers, yet permits the pivoting of handle 66 to alternative angular positions under a sufficient force, preferably substantially above ordinary forces exerted when utilizing handle 66 to push the carrier. Such frictional mounting is known in the art and therefore not further discussed herein. Handle 66 further includes a telescoping portion including a center bar 72 and opposed upper arms 74 and 76, each telescopingly engaged with its associated lower arm. Wing tip fasteners 78 and 80 are mounted in collars 82 and 84 near the top of their respective lower arms to facilitate adjustable positioning of the upper arm with respect to the lower arm.

Figure 2:
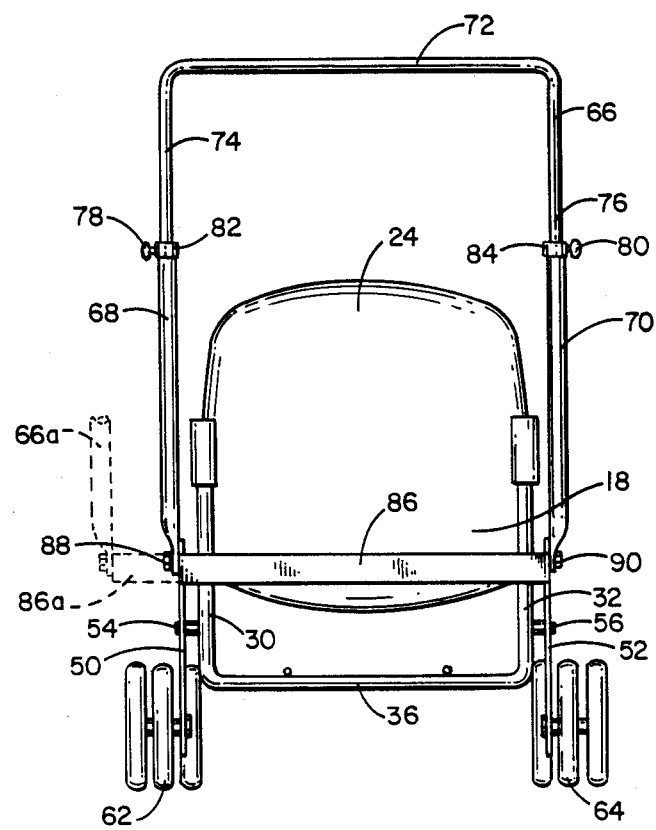
FIG. 2 is a rear elevation of the carrier of FIG. 1.
Figure 3:
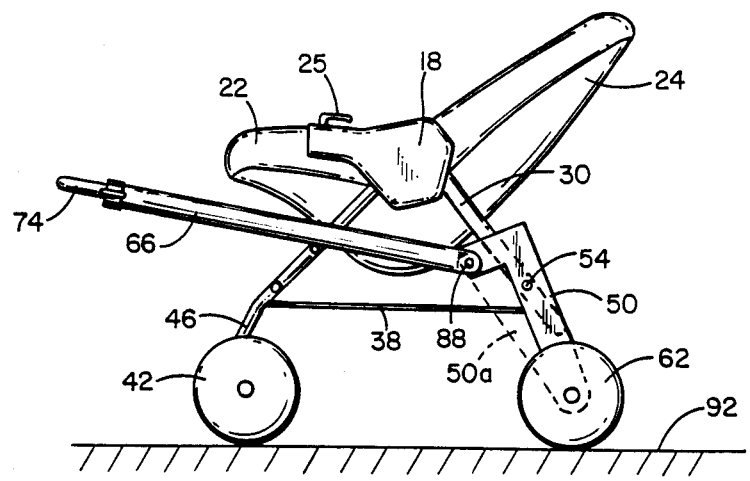
FIGS. 3 and 4 are side elevations showing the carrier in intermediate configurations.

As seen from FIG. 2, a rigid brade 86 spans the distance between levers 50 and 52 and is fixed to both levers. Brace 86 maintains the levers parallel to one another, and further engages frame assembly 20, specifically at rearward legs 30 and 32, when levers 50 and 52 are disposed in their operative position with respect to the shell and frame assembly as shown in FIGS. 1–3. Due to the downward and rearward slant of lever extensions 58 when in the operative position, the axis of rear wheels 62 and 64 is disposed rearwardly of lever pivots 54 and 56. Consequently, shell 18 and frame assembly 20, due to gravity, tend to urge levers 50 and 52 to rotate counterclockwise as viewed in FIGS. 1 and 3. Brace 86, when engaged with legs 30 and 32, prevents such rotation and thus maintains the levers in the operative position. Of course, a latch or other locking means can be provided if desired. However, a feature of the present invention is that such a latch is not required, which of course eliminates the chance for pinching or otherwise injuring fingers in such latches. An alternative arrangement (broken lines) utilizes an elongated brace 86a and a wider handle 66a that is positioned outside of the wheels.

Figure 4:
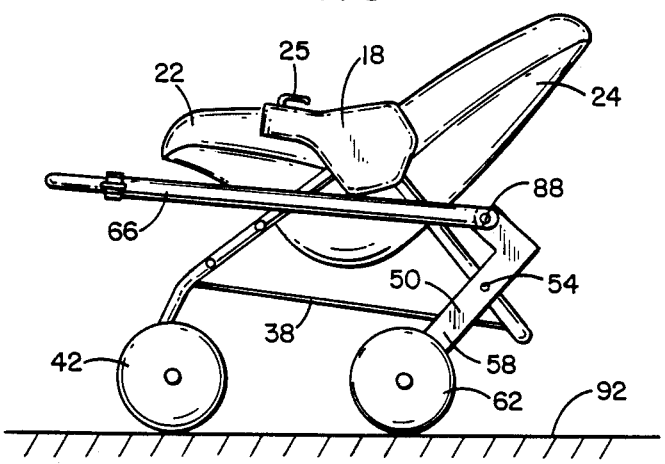
Figure 5:
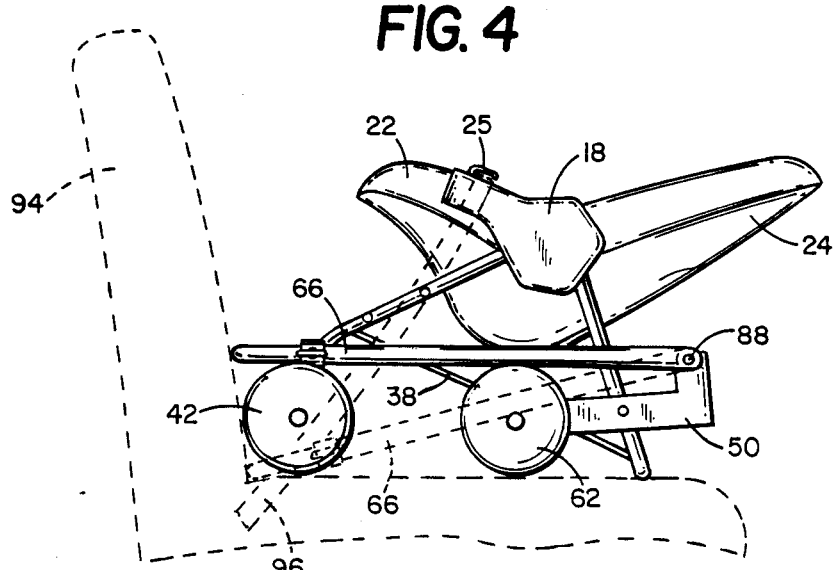
FIG. 5 is a side elevation of the carrier in a car seat configuration.

FIGS. 3–5 illustrate the convenient manner in which carrier 16 is adjusted from the stroller configuration to a car seat configuration. The user of the carrier first releases wing fasteners 78 and 80 to retract upper arms 74 and 76 into their corresponding lower arms 68 and 70, thus to collapse handle 66. After re-tightening the wing fasteners, the operator pivots the handle counterclockwise as viewed in FIG. 3 about handle pivots 88 and 90, thus to dispose handle 66 generally below shell 18 as shown in FIG. 3. It should be noted that with levers 50 and 52 in the operative position, center bar 72 of the handle readily clears the forward edge of the shell.

Next, center bar 72 is pushed rearwardly with one hand while the other grips carrier 16, either at the forward end of shell 18 or along forward horizontal member 34. This motion drives handle pivots 88 and 90 rearwardly relative to the carrier, pivoting levers 50 and 52 clockwise as viewed in FIGS. 3–5. For maximum mechanical advantage, this pushing is preferably accomplished with the handle approximately horizontal, or near a tangent of the arc traversed by the handle pivots as the levers rotate. Once the levers have pivoted sufficiently to position the rear wheel rotation axis forwardly of lever pivots 54 and 56 (FIG. 4), the levers continue to pivot, under the weight of the shell and frame assembly, to a car seat or storage configuration in which rear wheels 62 and 64 are tucked beneath the central portion of the shell, with rear horizontal frame member 36 contacting surface 92 or, as seen in FIG. 5, an automobile seat. A final step is a slightly further counterclockwise pivoting of handle 66 so that arms 68 and 70 are generally horizontal. This brings the handle somewhat closer to front wheel pairs 42 and 44.

Broken lines at 94 and 96 indicate respectively the back rest portion of an automobile seat, and an automobile seatbelt typically provided for securing passengers. Seatbelt 96 is arranged through hooks 25 and 27 to secure the shell. Thus, carrier 16 is fastened in the automobile with leg rest 22 relatively close to seat 94, and back rest 24 relatively remote. An infant or small child supported in the carrier thus faces seat 94. As previously noted, shell 18 is equipped with its own seatbelt (not shown) and an arrangement of slots, to secure the infant within the shell independently of any seatbelt provided in the automobile. Thus, as illustrated in FIG. 5, carrier 16 secures an infant or small child in what is recognized as the position for maximum safety, mainly with the child facing rearwardly of the automobile. The free end of handle 66 abuts the automobile seat to further secure and stabilize the carrier. Note also that alternative handle 66a can be pivoted adjacent the wheels to contact the bottom of seat back 94, to further enhance stability.

After an automobile trip, seatbelt 96 is unfastened and carrier 16 removed from the automobile in the configuration shown in FIG. 5, all with the infant or small child still secure within shell 18, and the carrier is placed upon a horizontal surface such as a driveway, sidewalk or the like. Then, the operator pivots levers 50 and 52 counterclockwise as viewed in FIGS. 3–5, simply by grasping and pulling upon center bar 72 with one hand, while pushing the other against shell 18 or horizontal frame member 34. Once the axis for the rear wheels is behind lever pivots 54 and 56, the levers readily pivot to the operative position where brace 86 engages legs 30 and 32 to position the levers. Finally, the operator pivots handle 66 to the desired angular location and adjusts upper arms 74 and 76 to position the handle as desired.

All of these steps are easily and conveniently performed with the small child or infant still secured in the shell.

As an alternative to the above-described manner of adjusting carrier 16 to the car seat configuration, handle 66 can be moved clockwise as viewed in FIG. 3, rather than counterclockwise, to a generally horizontal disposition. Then, the operator pulls center bar 66 with one hand while pushing the other against the rear of shell 18, to cause the aforementioned clockwise pivoting of levers 50 and 52. At this point handle 66 is rotated counterclockwise to the position illustrated in FIG. 5, or beyond. It should be noted that this sequence perhaps provides a leverage advantage, but requires the handle to remain extended until it has been pivoted to its storage position beneath the shell.

Figure 6:
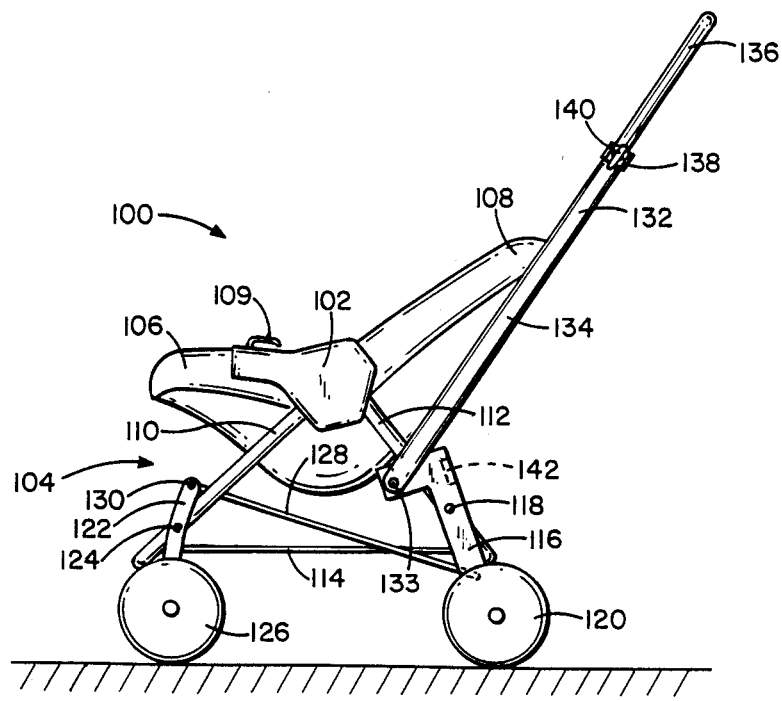
FIG. 6 is a side elevation of an alternative carrier in a stroller configuration.
Figure 7:
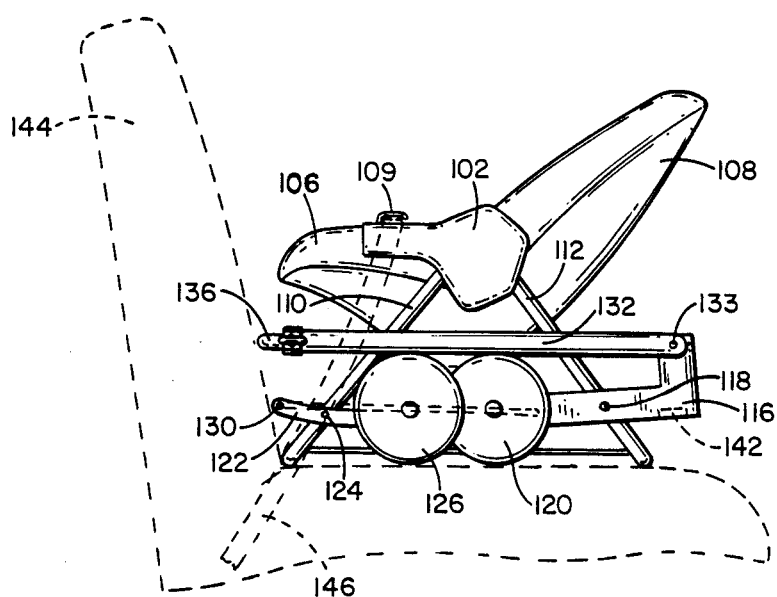
FIG. 7 is a side elevation showing the carrier of FIG. 6 in a car seat configuration.

FIGS. 6 and 7 illustrate an alternative carrier 100 including a contoured shell 102 and an integral triangular supporting frame assembly 104, each of these components being substantially similar to its counterpart described in connection with carrier 16. More particularly, shell 102 includes a leg rest 106, a back rest 108, and opposed hooks 109, while frame assembly 104 includes a forward leg 110, a rearward leg 112 and a horizontal link 114 for joining the legs at their free ends through horizontal frame members as described above. Corresponding frame members on the right side of shell 102 do not appear in FIGS. 6 and 7, but it is to be appreciated that such members are disposed relative to the shell in the manner described in connection with carrier 16. Two L-shaped rear levers are mounted to the respective rear legs of the frame, one such lever shown at 116 mounted to leg 112 through a lever pivot 118. A rear wheel 120 is mounted to the lower end of the long extension of lever 116, and the opposed rear wheel is likewise mounted.

Opposed and parallel forward levers, one of which is shown at 122, are pivotally mounted, each to its respective forward leg, as indicated at 124. A front wheel 126 is mounted to the lower end of forward lever 122, as is the opposite front wheel to its associated forward lever. Two parallel, spaced apart linking rods, one of which is shown at 128, join their associated forward and rearward levers. In particular, linking rod 128 is pivotally mounted to forward lever 122 at a rod pivot 130 on the opposite side of lever pivot 124 from the front wheel axis. The opposite end of rod 128 is mounted to rear lever 116 proximate wheel 120. The opposite linking rod is similarly mounted. A handle 132 is mounted pivotally to the rearward levers at a handle pivot 133 as previously described, and has telescoping lower and upper arms as indicated at 134 and 136, respectively. A collar 138 and wing fastener 140 facilitate extension, retraction and adjustment of handle 132.

In order to adjust carrier 100 from its stroller configuration to its storage or car seat configuration as shown in FIG. 7, handle 132 is manipulated in much the same manner described for handle 66 in connection with carrier 16. In particular, handle 132 is rotated counterclockwise as viewed in FIGS. 6 and 7 until it is at least near the angular position shown in FIG. 7, i.e. generally beneath shell 102. Such pivoting can be accomplished before or immediately after retracting the handle. Next, with one hand grasping the forward portion of the leg rest 106 or the forward end of frame assembly 104, the operator pushes the handle with the other hand, as previously described.

In connection with carrier 100, however, pushing the handle moves both front and rear wheels 126 and 120 from the operative position shown in FIG. 6 to the storage or tucked-under position shown in FIG. 7. In particular, as the handle is pushed to rotate rear lever 116 and the opposite rear lever counterclockwise, the lower portion of each lever pushes its associated linking rod 128 forward. The linking rods in turn cause their associated forward levers 122 to rotate counterclockwise on lever pivots 124. As before, once the rotational axis of the rear wheels is disposed forwardly of rear lever pivot 118, the weight of the shell and frame tends to further rotate the levers until they are tucked beneath the shell in the storage position as shown in FIG. 7. Accordingly, the linking rods continue to move until they have pivoted their associated forward levers to the position shown in FIG. 7. In this position, frame assembly 104 supports the shell on the automobile seat, while seatbelt 146 engages hooks 109 and handle 132 engages the automobile seat, to secure the carrier.

To change carrier 100 into the stroller position, handle 132 is pulled forwardly relative to shell 102 as previously described, to rotate rearward lever 116 and its counterpart. The rearward levers thus pull their associated linking rods rearward, thus to rotate the forward levers clockwise. When the rearward levers reach their operative position (FIG. 6), a brace 142 between the levers, shown in broken lines, engages the rearward legs in the manner previously described to maintain the rearward levers, and thus the forward levers as well, in their operative positions. It should be noted that the rotational axis of the forward wheels can be disposed forwardly of forward lever pivot 124, if desired, to further enhance the tendency of the carrier to remain in the stroller position by virtue of its own weight upon the forward and rearward wheels.

As compared to first embodiment carrier 16, carrier 100 is somewhat more complex as it includes additional moving parts, namely the forward levers and the linking rods. Carrier 100 has an advantage, however, in that it maintains a consistent orientation of shell 102 in the stroller and car seat positions. By way of contrast, shell 18 of carrier 16 is tilted slightly backwardly in the course of its adjustment from the stroller to the car seat position.

A back rest portion of a car seat is illustrated in broken lines at 144 in FIG. 7, with a seatbelt 146 likewise illustrated. In this manner, seatbelt 146 engages hooks 109 and firmly secures carrier 100 with respect to the automobile seat. Like previously mentioned shell 18, shell 102 is equipped with its own belt and arrangement of slots to secure an infant or small child within the shell.

Thus, carrier 16 and 100 provide a convenient means for carrying infants and small children, particularly in situations involving frequent conversion from the stroller to the car seat mode of travel. Each carrier is converted from one configuration to another by simple manipulation of the handle, without any independent adjustment to individual wheels. The frame is designed for retrofit mounting to an infant car seat of well known design, and maintains the infant seat in the recommended rearward facing position when used as a car seat. The convenience of using the carriers is enhanced in that all adjustments can be conveniently and safely effected with the infant or child secured within the shell.

What is claimed is:

1. An apparatus for carrying infants and small children in alternative stroller and automobile seat modes, said apparatus comprising:
   a shell contoured for carrying an infant or small child, said shell having a back rest and a leg rest disposed forwardly of the back rest;
   a frame means for supporting said shell in spaced apart relation to a generally horizontal surface, said frame means integral with and extended downwardly of said shell, and having a forward frame end beneath said leg rest and a rearward frame end beneath said back rest;
   a first wheel supporting lever means mounted proximate one of said forward and rearward frame ends to pivot about a horizontal first axis between first and second lever positions relative to the frame means, said lever means including a stop means positioned to engage the frame means responsive to the pivoting of the first lever means to said first lever position and further positioned such that the shell and frame means, by gravity, tend to maintain the stop means and frame means so engaged;
   first and second wheels rotatably mounted with respect to the opposite of said frame ends;
   third and fourth wheels mounted rotatably to said lever means for rotation about a second axis parallel to the first axis, said third and fourth wheels disposed in a lowered operative position when the first lever means is in said first lever position, and said third and fourth wheels disposed in a raised storage position beneath said frame means when said first lever means is in said second lever position; and
   a handle including a generally horizontal center member and first and second parallel aarms extending from opposite sides of the center member, the ends of said arms remote from the center member being mounted pivotally to said first lever means to pivot about a third axis parallel to and spaced apart from the first axis, thereby said handle is pivotable between a handle operating position wherein said arms extend generally upwardly and rearwardly along and on opposite sides of said back rest to locate said center member above and behind said shell, and a handle storage position wherein said arms are disposed generally forwardly and horizontally on opposite sides of and generally below said shell, said handle further being movable in a horizontal direction, while in said handle storage position, to selectively pivot said first lever means between said first and second lever positions.

2. The apparatus of claim 1 wherein:
   each of said first and second arms includes telescoping arm portions and a fastening means for releasably fixing said telescoping arm portions with respect to each other, to enable the extending of said handle to a select height above said back rest when in said operating position, and the retracting of said handle when in the storage position.

3. The apparatus of claim 2 wherein:
   said first lever means is mounted proximate said rearward frame end.

4. The apparatus of claim 3 further including:
   a second lever means proximate said forward frame end and mounted to pivot with respect to the frame means about a fourth axis parallel to and spaced apart from the first axis, said first and second wheels being mounted rotatably on said second lever means;

said second lever means being pivotable between a first lever location position to place said first and second wheels in an operative disposition relative to the frame means, a lowered a second lever position to place said first and second wheels in a raised storage disposition beneath the frame means; and a linkage means operatively connecting said first and second lever means whereby said second lever means is pivoted to said first and second lever positions, respectively, responsive to the pivoting of said first lever means to said first and second positions.

5. The apparatus of claim 4 wherein:

said first lever means includes first and second levers connected pivotably to opposite sides of said rearward frame end.

6. The apparatus of claim 5 wherein:

said third axis is disposed below and rearwardly of said first axis when said first lever means is in said first lever position; and said stop means includes a brace connected to said first and second levers, behind the frame means and engaged with the frame means when said first and second levers are in said first lever position.

7. The apparatus of claim 5 wherein:

said first and second levers are generally L-shaped, each with a relatively long first extension generally horizontally disposed when the levers are in said second lever position, each lever further including a relatively short second extension perpendicular to and upwardly of its associated first extension when in said second lever position; said third axis located along said second extensions to position said first and second arms above and generally parallel to said first extensions wwhen said first and second levers are in said second lever position and said handle is in said storage position.

8. The apparatus of claim 5 wherein:

said second lever means include parallel and spaced apart third and fourth levers pivotally mounted to opposite sides of said forward frame end.

9. The apparatus of claim 8 wherein:

said third and fourth levers, when in said first lever location, position said second axis forwardly of and below said fourth axis.

10. The apparatus of claim 8 wherein:

said linkage means includes a first rod pivotally connected to said first and third levers, and a second rod parallel to the first rod and pivotally connected between said second and fourth levers.

11. The apparatus of claim 4 wherein:

said forward and rearward frame ends contact said surface when said first and second lever means are in their respective second positions.

* * * * *

UNITED STATES PATENT AND TRADEMARK OFFICE
CERTIFICATE OF CORRECTION

PATENT NO. : 4,832,354

DATED : May 23, 1989

INVENTOR(S) : Terry R. LaFreniere

It is certified that error appears in the above-identified patent and that said Letters Patent is hereby corrected as shown below:

Column 8, Line 35, "aarms" should read -- arms --.

Column 8, Line 40, "thereby" should read -- whereby --.

Column 9, Line 4, "location" should be deleted.

Column 9, Line 5, "an" should read -- a lowered --.

Column 9, Line 6, "a lowered" should read -- and --.

Column 10, Line 8, "wwhen" should read -- when --.

Signed and Sealed this

Sixteenth Day of January, 1990

*Attest:*

JEFFREY M. SAMUELS

*Attesting Officer*  *Acting Commissioner of Patents and Trademarks*